3,560,623
GRISEOFULVIN COMPOSITION
Herbert J. Florestano, Indianapolis, Ind., assignor to
The Dow Chemical Company, Midland, Mich.
No Drawing. Continuation-in-part of application Ser. No. 517,988, Jan. 3, 1966. This application Apr. 10, 1969, Ser. No. 815,204
Int. Cl. A61k 27/00
U.S. Cl. 424—285  1 Claim

ABSTRACT OF THE DISCLOSURE

Compositions containing griseofulvin and a substantially anhydrous vehicle, the vehicle comprising at least 50 percent of 12 to 18 carbon atoms difatty acid esters of polyethylene glycols of from 200 to 600 molecular weight and at least ten percent of a substantially anhydrous modifying substance, are useful in the control of fungal organisms. Typically, the compositions comprise from about 0.05 to about 10 percent griseofulvin and are employed in topical applications to combat fungal organisms on animal skin surfaces.

CROSS-REFERENCE TO RELATED APPLICATION

This is a continuation-in-part of application, Ser. No. 517,988, filed Jan. 3,1966, and now abandoned.

BACKGROUND OF THE INVENTION (1) Field of the invention

This invention relates to a new composition useful for control of fungal organisms and for the topical application of the antibiotic griseofulvin.

(2) Description of the prior art

Griseofulvin is an antibiotic isolated from *Penicillium griseofulvum* or from *Penicillium janczewskii*. Griseofulvin has been shown to be effective against the group of infections known as ringworm infections: *Tinea barbae, tinea corporis, Tinea cruris, Tinea capitis, Tinea pedis* and onychomycosis. Griseofulvin has been shown to exert fungistatic rather than fungicidal effects on the organisms involved in these infections. In such uses, griseofulvin has been administered almost exclusively by the oral route. Griseofulvin has been incorporated in various vehicles such as polyethylene glycol, or in an ointment containing a lanolin-peanut oil-paraffin base. See, for example, British Pat. No. 810,377. In other operations, the griseofulvin has been mixed with a surfactant and acylated monoglyceride to produce a lotion which is then incorporated into an ointment base. However, the topical application of griseofulvin in various ointments and creams has not proved particularly effective. See Robinson, Current Medical Digest, volume 34, 1501–1506. There is a great continuing need for a griseofulvin composition which can be employed effectively in the topical application of griseofulvin.

SUMMARY OF THE INVENTION

The present invention is directed to a composition containing at least about 0.05 percent by weight of griseofulvin in admixture with a substantially anhydrous vehicle containing at least 50 percent of difatty acid esters of a polyethylene glycol, the vehicle also containing at least ten percent of one or more substantially anhydrous modifying substances selected from glyceryl waxes, that is, simple and mixed mono-, di- and triglycerides which are solids at room temperature, and solid or liquid petrolatum. In the present specification and claims, the term "fatty acid" refers to fatty acids containing from 12 to 18 carbon atoms, inclusive, and the term "polyethylene glycol" refers to polyethylene glycols having a molecular weight of from about 200 to about 600. The preferred difatty acid esters of polyethylene glycols are the distearate and dilaurate esters of polyethylene glycol 400. In the present specification and claims, the average molecular weight of a polyethylene glycol or polyethylene glycol moiety is designated in the conventional manner by the numeral following the term "polyethylene glycol." Thus, "polyethylene glycol 400" designates a polyethylene glycol having an average molecular weight of 400. The preferred glyceryl waxes are synthetic triglycerides such as glyceryl tristearate or tripalmitate or mixtures thereof with mono- or diglycerides or mixed glycerides in which the glyceryl wax melts at a temperature greater than about 45° C. and in which the concentration of unesterified hydroxyl moieties is low, being generally less than five percent of the glyceryl wax composition by weight. A particularly preferred glyceryl wax is a glyceryl tristearate wax (Glycowax S–932).

The composition of the invention can be employed in a number of applications for the control of microorganisms, and is particularly useful in the control of fungi. Solid compositions can be employed as sealants for containers to prevent contamination of the contents of the container by microorganisms and particularly by fungi. For example, the solid compositions can be employed to seal petri dishes containing valuable bacteria cultures to prevent contamination of the cultures by air-borne fungal organisms. The compositions are particularly useful for the treatment of animal skin and skin products. Thus, they can be employed to lubricate, disinfect and protect leather goods from attack by microorganisms. They are also useful in combating fungal organisms of animal skin surfaces.

The present griseofulvin composition, when employed topically, gives better control of various pathogenic fungal organisms than griseofulvin compositions containing other vehicles. Furthermore, it is an advantage of the present invention that the novel composition facilitates the passage of the griseofulvin through animal skin. Once the griseofulvin has passed through the skin, it can be transferred systemically to infected areas. Thus, the new griseofulvin composition can be applied to non-infected skin distal to the infected area with resulting control and elimination of the infection. Other advantages of the present invention will become apparent.

The compositions can be formulated by mixing the difatty acid polyethylene glycol ester materials together with one or more of the designated substantially anhydrous modifying substances and with griseofulvin in any order or fashion. It is desirable to heat the solid vehicle materials to the melting point and mix the same together before the addition of the griseofulvin. The griseofulvin can be mixed with the heated vehicle ingredients by conventional procedures or the mixture of melted carrier materials can be cooled until the mixture solidifies after which the griseofulvin is mixed with the solid material by conventional procedures. In any case, the griseofulvin should be intimately mixed with the carrier.

The amount of griseofulvin to be incorporated in the vehicle will vary depending upon such factors as the particular organism or organisms to be controlled, the substrates to be treated with the composition, the degree of microbial infestation of the substrate and whether the composition is to be employed directly or as a concentrate to be diluted before use. Generally, good antimicrobial results are obtained and particularly excellent antifungal results are obtained with compositions comprising from about 0.05 percent to about 10 percent of griseofulvin by weight of ultimate treating composition. For topical application to uninfected animal skin, good results have been obtained with as little as about 0.05 percent by weight of griseofulvin in the composition. On the other hand, for use against active fungal infestation, it is desirable to employ from 0.5 to 1 percent or more of griseofulvin in the composition. Concentrate compositions can contain from about 5 to 10, to about 20 to 50 percent, or from about 50 to 95 percent by weight of the antibiotic.

The difatty acid esters of polyethylene glycols vary in consistency from liquids to soft or waxy solids at room temperature. By selecting a particular difatty acid ester of polyethylene glycol, or a combination of such esters, the consistency of the vehicle may be varied so as to suit the requirements of different climatic conditions and to adjust the consistency of the completed product, depending upon the amount and nature of the modifying substances being added. An exceptionally useful formulation comprises from about 0.05 to about 10 percent by weight of griseofulvin in intimate admixture with a solid or semi-solid substantially anhydrous vehicle formulated to contain from about 55 to about 60 percent by weight of polyethylene glycol 400 dilaurate, from about 5 to about 10 percent by weight of polyethylene glycol 400 distearate and from about 9 to about 13 parts by weight of each of the three substantially anhydrous modifying substances, liquid petrolatum, glyceryl wax and solid petrolatum, The following examples are merely illustrative and not intended to be limiting.

Example 1

Eighteen grams of Glycowax S–932 (a glyceryl stearate wax), 36 grams of polyethylene glycol 400 distearate and 36 grams of polyethylene glycol 400 dilaurate are heated to melt in a clean, dry sterile vessel. Following the melting period, the mixture is stirred constantly while cooling at room temperature. Griseofulvin (0.5 percent by weight) is added to the cooled mixture and the product is milled to a uniform consistency.

Example 2

Three pounds white mineral oil U.S.P., 3 lbs. white petrolatum U.S.P., 2 lbs., 13 ozs. 78 gr. Glycowax S–932 (a glyceryl stearate wax), 2 lbs. 13 oz., 78 gr. polyethylene glycol 400 distearate and 18 lbs. 5 oz., 280 gr. polyethylene glycol 400 dilaurate are placed in a clean dry sterile vessel. The mixture is heated to approximately 125° C. and maintained at that temperature with occasional stirring for two hours. The mixture is allowed to cool to approximtely 55°–60° C. It is then gently stirred until cooled to approximately 40°–45° C. to produce an anhydrous vehicle. To 3 lbs. of this vehicle is added 0.3 lb. of griseofulvin. The product is mixed well and milled. Enough of the above vehicle composition is added to make 30 lbs. and mixed again to complete the preparation.

Example 3

An antifungal composition is prepared by combining in a dry sterile vessel 30 grams of polyethylene glycol 400 dilaurate, 30 grams of polyethylene glycol 400 distearate and 15 grams of Glycowax S–932. Thereafter, the mixture is heated at a temperature of 105°–110° C. for two hours and then cooled to 45° C. One percent by weight of griseofulvin is added with stirring to the cooled mixture. This mixture is milled and then dispensed in tubes each containing 7.5 grams of composition representing 0.075 gram of griseofulvin.

In the foregoing examples, instead of the preferred combination of polyethylene glycol 400 dilaurate and polyethylene glycol 400 distearate, it is possible to use only one of them, or combinations of either or both with one or more of the following: polyethylene glycol 200 dilaurate, polyethylene glycol 400 dioleate, polyethylene glycol 600 dioleate, polyethylene glycol 600 distearate and the like, depending upon the consistency desired and proportion of modifying substances to be added.

The compositions of Examples 1, 2 and 3 are employed to seal containers to prevent bacterial or fungal contamination of the contents, to treat various substrates to combat bacterial and fungal organisms and to combat fungal organisms on animal skin and animal skin products.

In the foregoing specific examples wherein the usual or preferred concentrations of griseofulvin are shown, it is to be understood that satisfactory treating preparations are obtained when the percentage of griseofulvin is varied from about 0.05 percent up to about 10 percent.

Example 4

Griseofulvin (1 gram) is admixed with sufficient base composed of liquid petrolatum (10 grams), white petrolatum (10 grams), Glycowax S–932 (12 grams), polyethylene glycol 400 distearate (10 grams) and polyethylene glycol 400 dilaurate (58 grams) to make 100 grams. The ability of the composition of the invention to combat fungal organisms on animal skin substrates is illustrated by the following procedure:

The shaved backs of white guinea pigs are inoculated with a standardized spore suspension of *Trichophyton mentagrophytes* by scatching through the suspension over a circular area of about 1.5 cm. diameter with sufficient pressure to produce slight scarification of the skin. With the technique employed, two to three days after the inoculation, a definite area of erythema appears, increasing with minor scaling through about the fifth day. Around the sixth day, the lesion shows a raised periphery, increased scaliness and with crust formation beginning to develop. The crust formation reaches maximum development at about the twelfth day, after which time the crusts begin to fall off either in part or completely.

Application of the griseofulvin composition prepared as described above directly to the inoculated area one day after inoculation and continued once daily for a total of six applications prevents the formation of the experimental lesion. Similar results are obtained in similar procedures carried out with compositions comprising an identical vehicle and containing griseofulvin in amounts of 0.1 percent or 0.5 percent by weight.

No symptoms of toxicity or local irritation attributable to the application of the compositions are detected.

Example 5

Three compositions are prepared each containing one percent griseofulvin by weight. The vehicle of one such composition comprises equal parts of polyethylene glycol 400 distearate, polyethylene glycol 400 dilaurate, white petrolatum and glyceryl wax (Glycowax S–932). The vehicle of the second such composition contains 40 percent by weight of each of polyethylene glycol 400 dilaurate and polyethylene glycol 400 distearate and 20 percent glyceryl wax (Glycowax S–932). The vehicle of Example 4 is employed in the third composition. A nutrient agar preparation is inoculated with *Trichophyton mentagrophytes* to prepare a suspension of viable spores of the fungal organism in nutrient agar. The agar preparation is then poured into petri dishes and allowed to solidify. Holes of uniform size are then bored into the agar in each plate and the holes are separately filled with the above-described compositions. Separate plates are similarly prepared as checks, holes are bored therein and the holes are filled with above-described vehicles containing no griseofulvin. The plates are then incubated for five days after which they are observed to ascertain the inhibition of the growth of the test organism in the nutrient agar surrounding the holes. These observations indicate lack of inhibition of the growth of *Trichophyton mentagrophytes* in the check petri dishes, all of these petri dishes showing substantially uniform growth of fungal organisms throughout the agar surface. In the petri dishes in which the three compositions containing one percent of griseofulvin were employed, substantial inhibition of each of the test organisms is indicated by the presence of a zone of agar about 14 millimeters in width showing no growth of the test organism surrounding each of the bored holes filled with one such composition.

Example 6

The backs of guinea pigs are completely shaved. The animals are inoculated as described in Example 4 on the dorsum and caudad. On the first day following the inoculation and for five days thereafter, the griseofulvin composition prepared as described in Example 4 is applied once daily to the bald area behind the ears. The griseofulvin composition is not applied directly to the inoculated area. Other guinea pigs are similarly prepared and inoculated. These animals are treated in exactly the same manner with a composition consisting of one percent griseofulvin in white petrolatum. The animals treated with the griseofulvin-white petrolatum compositions are found to develop lesions having the same pathological pattern and duration as the lesions observed in untreated animals. On the other hand, the animals treated with the griseofulvin composition of Example 4 never develop the lesions seen in the untreated animals and in the animals treated with the petrolatum-griseofulvin composition.

No symptoms of toxicity or local irritation attributable to the composition of Example 4 are noted at any time during the test period.

Example 7

In still further operations, guinea pigs are inoculated with *Trichophyton mentagrophytes* spores exactly as previously described. The infection is allowed to progress for four days before treatment is begun. Beginning on the fourth day and for six days thereafter (seven applications), 0.5 gram of the griseofulvin composition of Example 4 is added directly to the lesion. Control animals are inoculated in exactly the same manner and at the same time as the animals which are subsequently treated with the griseofulvin composition. The control animals are not treated and the infection is allowed to progress normally. In the animals treated with the griseofulvin composition, the infections never develop past the erythematous stage, with only minor scaling. This is in contrast to the bloody, serous lesion with crust formation that develops in the untreated control animals.

In a series of comparison operations, similar groups of guinea pigs are similarly inoculated at the same time and in the same manner; however, these comparison animals are treated with one of (a) the vehicle of Example 4, (b) one percent griseofulvin in a mixture of polyethylene glycols 400 and 4000, (c) one percent griseofulvin in a mixture of polyethylene glycols 400, 1000, 1540 and 4000, or (d) one percent griseofulvin in an aqueous carrier containing 2 percent beeswax, 18 percent stearic acid, 5 percent polyethylene glycol 400 monostearte and 8 percent polyethylene glycol 1000 monostearate. All of the comparison animals treated with such comparison compositions are observed to develop lesions having the same pathological pattern and duration as is observed in the untreated control animals.

No symptoms of toxicity or local irritation attributable to any of the compositions are noted at any time during the test period.

What is claimed is:

1. A composition containing one percent by weight of griseofulvin in admixture with a substantially anhydrous vehicle, said vehicle consisting essentially of about 58 percent of polyethylene glycol 400 dilaurate, about 10 percent of polyethylene glycol 400 distearate, about 10 percent of solid petrolatum, about 10 percent of liquid petrolatum, and about 12 percent of a substantially anhydrous glyceryl tristearate wax, the glyceryl tristearate wax being a solid at room temperature and melting at a temperature greater than about 45° C.

References Cited

UNITED STATES PATENTS 2,713,019  7/1955  Jeffries  424—177

FOREIGN PATENTS 810,377  4/1959  Great Britain.

OTHER REFERENCES

British Medical Journal, November 28, 1959, p. 1165.

JEROME D. GOLDBERG, Primary Examiner